United States Patent
Chang et al.

(10) Patent No.: US 11,280,926 B2
(45) Date of Patent: Mar. 22, 2022

(54) HYDROPHONE HAVING NO INTERNAL LEADS

(71) Applicant: Halliburton Energy Services, Inc., Houston, TX (US)

(72) Inventors: Chung Chang, Houston, TX (US); Yee Siang Teh, Bedok (SG); Ife Ogbunuju, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 458 days.

(21) Appl. No.: 16/414,925

(22) Filed: May 17, 2019

(65) Prior Publication Data

US 2019/0302303 A1  Oct. 3, 2019

Related U.S. Application Data

(63) Continuation of application No. 15/519,812, filed as application No. PCT/US2014/065960 on Nov. 17, 2014, now Pat. No. 10,330,810.

(51) Int. Cl.
| | | |
|---|---|---|
| *G01V 1/50* | (2006.01) | |
| *G01V 1/18* | (2006.01) | |
| *E21B 47/01* | (2012.01) | |
| *E21B 47/06* | (2012.01) | |
| *E21B 47/017* | (2012.01) | |

(52) U.S. Cl.
CPC ............. *G01V 1/50* (2013.01); *E21B 47/017* (2020.05); *E21B 47/06* (2013.01); *G01V 1/186* (2013.01); *G01V 2210/1429* (2013.01)

(58) Field of Classification Search
CPC .. G01V 1/50; G01V 1/186; G01V 2210/1429; G01V 1/40; E21B 47/017; E21B 47/06; E21B 47/18; E21B 21/01; E21B 47/00; G01H 11/08; H04R 1/44; H04R 17/00
See application file for complete search history.

(56) References Cited

U.S. PATENT DOCUMENTS

| | | | |
|---|---|---|---|
| 3,263,209 A | 1/1964 | Madison | |
| 3,187,300 A | 6/1965 | Brate | |
| 3,263,210 A * | 7/1966 | Schloss | ................. B06B 1/0655 367/159 |

(Continued)

FOREIGN PATENT DOCUMENTS

| | | | | |
|---|---|---|---|---|
| AU | 2014412039 B2 * | 3/2018 | ............. | E21B 47/06 |
| BR | 112017007169 A2 * | 12/2017 | ............. | E21B 21/01 |

(Continued)

OTHER PUBLICATIONS

CN-107075940-A Translation (Year: 2016).*
International Search Report and Written Opinion dated Jul. 24, 2015, for PCT/US2014/065960, filed on Nov. 17, 2014.

*Primary Examiner* — Daniel Pihulic
(74) *Attorney, Agent, or Firm* — Chamberlain Hrdlicka

(57) ABSTRACT

A hydrophone free from internal leads and further including a stabilizing jacket is described. The hydrophone uses the metallic end caps of the stabilizing jacket to complete the circuit thereby eliminating the need for internal leads. Further, the stabilizing jacket results in a hydrophone configuration that can withstand harsher conditions while nonetheless providing excellent detection capabilities.

20 Claims, 6 Drawing Sheets

(56) References Cited

U.S. PATENT DOCUMENTS

| | | | |
|---|---|---|---|
| 4,163,206 A | 7/1979 | Hall, Jr. | |
| 4,178,577 A | 12/1979 | Cini et al. | |
| 4,228,532 A * | 10/1980 | Sims | B06B 1/0655 |
| | | | 310/337 |
| 4,300,218 A | 11/1981 | Kruka et al. | |
| 4,755,708 A | 7/1988 | Granz | |
| 5,199,004 A * | 3/1993 | Monahan | B06B 1/0655 |
| | | | 367/157 |
| 5,276,657 A | 1/1994 | Newnham | |
| 6,188,646 B1 | 2/2001 | Luscombe et al. | |
| 6,671,380 B2 | 12/2003 | Chang et al. | |
| 10,330,810 B2 * | 6/2019 | Chang | G01V 1/186 |
| 2002/0118849 A1 * | 8/2002 | Chang | H04R 17/00 |
| | | | 381/190 |
| 2012/0055243 A1 | 3/2012 | Difoggio et al. | |
| 2017/0248724 A1 * | 8/2017 | Chang | G01V 1/50 |
| 2018/0258756 A1 * | 9/2018 | Nguyen | G01S 7/52065 |
| 2019/0302303 A1 * | 10/2019 | Chang | G01V 1/50 |

FOREIGN PATENT DOCUMENTS

| | | | |
|---|---|---|---|
| CA | 3051887 A1 * | 5/2016 | E21B 47/06 |
| CA | 2964080 C * | 10/2019 | E21B 47/06 |
| CN | 102506990 A1 | 6/2012 | |
| CN | 102901981 A1 | 1/2013 | |
| CN | 203595548 | 5/2014 | |
| CN | 105044778 A1 | 11/2015 | |
| CN | 106200455 A * | 12/2016 | |
| CN | 107075940 A * | 8/2017 | E21B 21/01 |
| GB | 2545143 A * | 6/2017 | E21B 47/18 |
| MX | 2017004985 A * | 6/2017 | E21B 47/06 |
| WO | 2013175010 A2 | 11/2013 | |
| WO | WO-2016080951 A * | 5/2016 | E21B 47/06 |

\* cited by examiner

HYDROPHONE HAVING NO INTERNAL LEADS

The present disclosure describes a new sensor construction and more particularly, a hydrophone configuration that, in one embodiment, can be used in logging-while-drilling (LWD) systems.

Many applications exist for hydrophones and other pressure pulse sensors. One common use for hydrophones is in sonar detecting devices, like those that are used to detect submarines. A hydrophone uses transducers to convert a pressure wave (e.g., a sound) to an electrical signal. Hydrophones now find use in many environments. They are currently used, in such diverse areas as the deep ocean to measure seismic activity and in oil wells, to measure fluid characteristics. While the sensors as described will be discussed within the context of their use in an oil well, they can be used in any environment where a typical hydrophone would be used and, in some environments that could not previously be studied using a traditional hydrophone due to its fragility.

Unfortunately, conventional hydrophones and other pressure sensors are fragile. They generally do not respond well to low frequency pressure waves and are sensitive to movement of the tools carrying the sensors. The fragility and tool movement sensitivity problems are undesirable in any environment, but are particularly detrimental in an oil well or downhole environment where tool movement, shock and vibration, temperature extremes, and erosive mud flow are common. Additionally, where a pressure sensor is used in a downhole signal transmission system, the lack of low frequency response is very undesirable since it is known that pressure pulses are attenuated far less at low frequencies and, therefore, low frequency signals may be transmitted greater distances. Thus, it would be a significant improvement in the art to provide a pressure sensor that is robust and that is less sensitive to environmental fluctuations.

A better understanding of the various disclosed system and method embodiments can be obtained when the following detailed description is considered in conjunction with the drawings.

DETAILED DESCRIPTION

Figure 1:
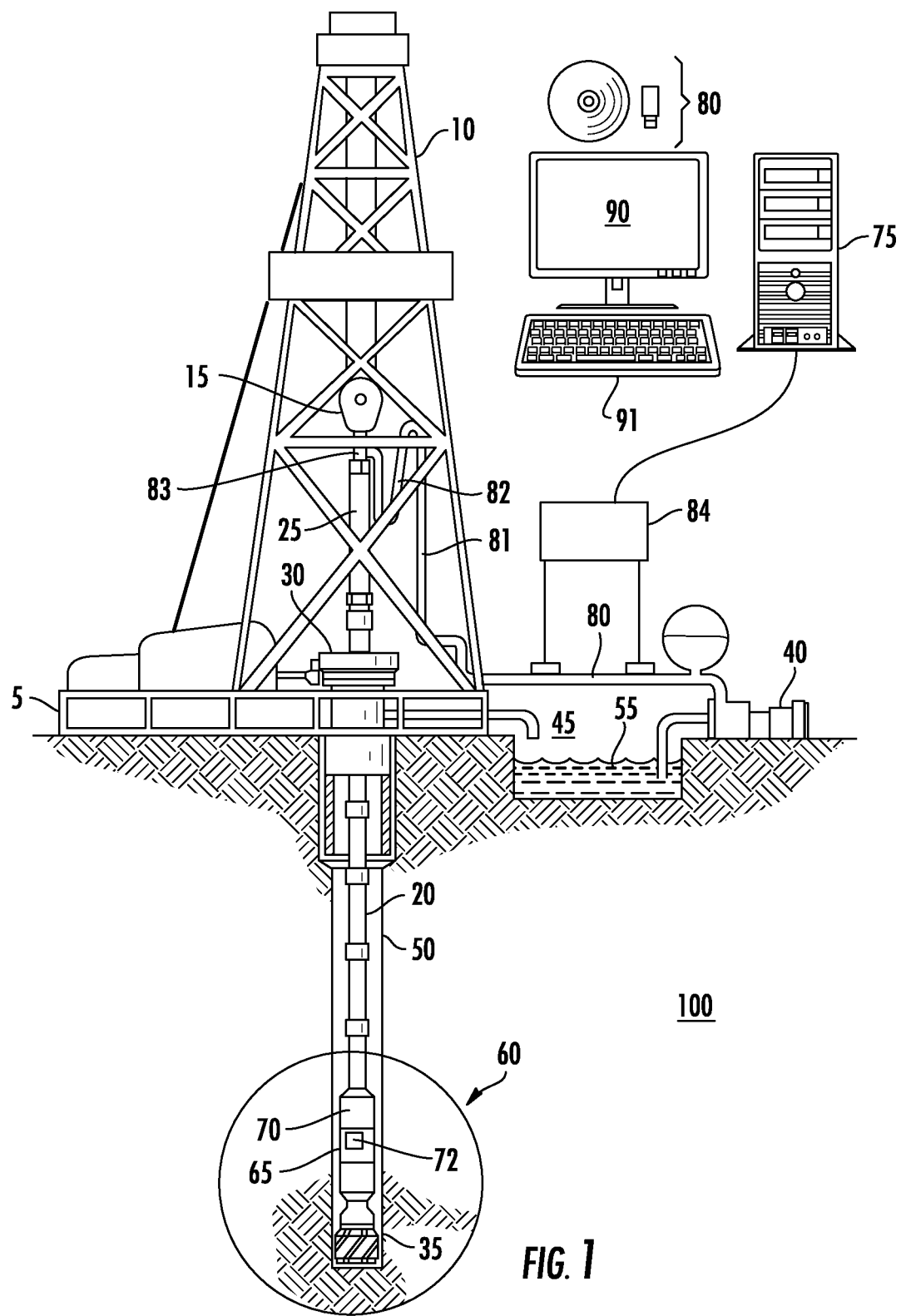
FIG. 1 is a schematic diagram of a logging-while-drilling environment according to an illustrative embodiment.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not structure or function.

In the following discussion and in the claims, the terms "including" and "comprising" are used in an open-ended fashion, and thus should be interpreted to mean "including, but not limited to". The use of "top," "bottom," "above," "below," and variations of these terms is made for convenience, but does not require any particular orientation of the components.

The hydrophone discussed herein may be utilized in various contexts to determine properties in downhole environments. By way of example, it may be included in a tool to receive signals transmitted as pressure pulses from the surface, it may be used in a sensor to monitor seismic signals that create pressure waves in a wellbore, in may be included in a drill string to monitor dynamic pressure waves during drilling. The embodiments may be utilized to determine properties in logging-while-drilling (LWD) environments, wireline, or other logging environments, as well as in marine seismic and sonar environments. Other applications, including non-drilling applications are contemplated.

FIG. 1 is a schematic diagram of a logging-while-drilling environment 100 according to an illustrative embodiment. LWD may also be referred to as measurement-while-drilling (MWD). A drilling platform 5 is equipped with a derrick 10 that supports a hoist 15. A rig operator drills an oil or gas well for production or exploration using a string of drill pipes 20. The hoist 15 suspends a top drive 25 that rotates a drill string 20 as it lowers the drill string 20 through the wellhead 30. Connected to the lower end of the drill string 20 is a drill bit 35. The drill bit 35 is rotated and drilling is accomplished by rotating the drill string 20, by use of a downhole motor near the drill bit 35 or the top drive 25, or by both methods.

In one embodiment, recirculation equipment 40 pumps drilling mud or other fluids through a flow line 80 to the derrick 10. The flow line 80 goes up the derrick 10 and connects 25 to a swivel 83 on the top drive through a stand pipe 81 and a flexible Kelly hose 82 to permit fluid to be pumped through the top drive 25 and into the drill string 20 below. The fluid is delivered down through the drill string 20 at high pressures and volumes to emerge through nozzles or jets in the drill bit 35. The drilling fluid then travels back up the hole via an annulus formed between the exterior of the drill string 20 and a borehole wall 50, through a blowout preventer (not illustrated) and a return line 45 into a retention pit 55, reservoir, or other enclosed receptacle(s) on the surface. On the surface, the drilling fluid may be cleaned and then recirculated by the recirculation equipment 40. The drilling fluid may be utilized to carry cuttings from the base of the bore to the surface and balance the hydrostatic pressure in the rock formations in the LWD environment 100.

A bottom hole assembly 60 (i.e., the lowermost part of drill string 20) may include thick walled tubular elements called drill collars, which add weight, stability, and rigidity to aid the drilling process. The thick walls of these drill collars make them useful for housing instrumentation, tools, and LWD sensors. For example, in an embodiment, the bottom hole assembly 60, or well tool, of FIG. 1 includes a sensor system 65 and a communications and control module 70. The sensor system 65 includes one or more hydrophones 72 along with necessary support circuitry.

From the various bottom hole assembly 60 sensors, the communications and control module 70 (telemetry module) may collect data regarding the formation properties or various drilling parameters, tool configurations and readings, and stores the data, for example in internal 30 memory. In addition, some or all of the data may be transmitted to the surface by wireline communications, wireless communications, magnetic communications, seismic communications, or mud telemetry.

The communications signals may be received by a surface receiver 84, converted to an appropriate format, and processed into data by one or more computing or communications devices such as computer 75. Computer 75 may include a processor that executes software which may be stored on portable information storage media 80, such as thumb drives, CDs, DVRs or installed computer memory, such as a hard disk, random access memory, magnetic RAM (MRAM) or other forms of non-volatile memory. The computer 75 may also receive user input via an input device 91, such as a keyboard, mouse pointer and mouse buttons, microphone, or other device to process and decode the received signals. The resulting sensory and telemetry data may be further analyzed and processed by computer 75 to generate a display of useful information on a computer monitor 90 or some other form of a display device or output, such as a mobile device like a hand held smart phone or a tablet PC. For example, a driller may employ the system of the LWD environment 100 to obtain and view information about downhole substances.

Figure 2:
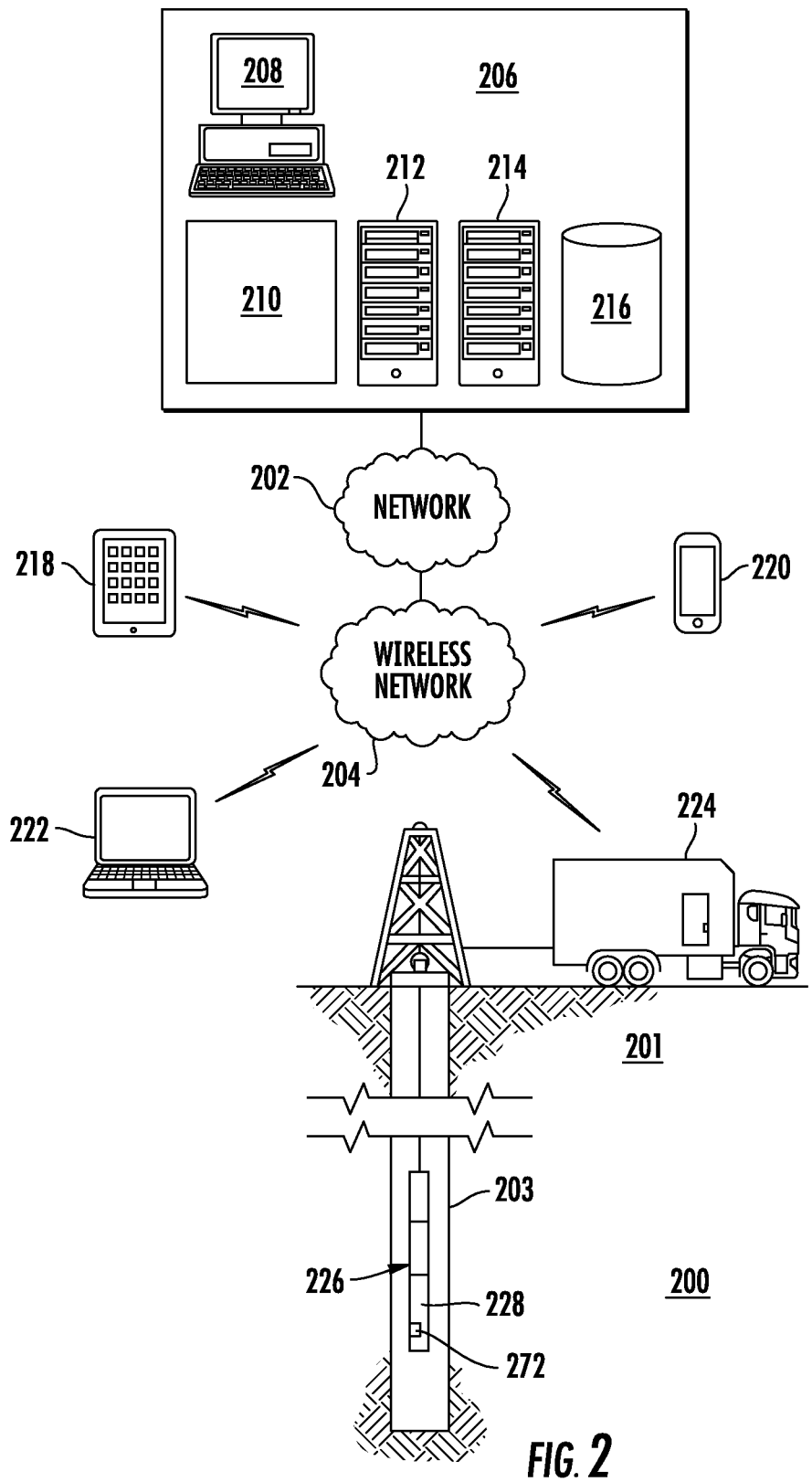
FIG. 2 is a schematic diagram of a logging environment according to an illustrative embodiment.

FIG. 2 is a schematic diagram of a logging environment 200 in accordance with an illustrative embodiment. The logging environment 200 may include any number of tools, devices, locations, systems, and equipment that may be utilized to provide the sensor tools, systems, and methods. The logging environment 200 may include a reservoir 201. The reservoir 201 is a designated area, location, or three-dimensional space that may include natural resources, such as crude oil, natural gas, or other hydrocarbons. The reservoir 201 may include any number of formations, surface conditions, environments, structures, or compositions. In an embodiment, sensors are utilized to determine properties and measurements of the reservoir 201 and a wellbore 203 penetrating the reservoir. For example, one or more hydrophones 72 may be utilized to measure properties in reservoir 201 and a wellbore 203 as described above with reference to FIG. 1. Processing or computations utilizing the measured properties may be performed downhole, on-site, off-site, at a movable location, at a headquarters, utilizing fixed computational devices, utilizing wireless devices, or over a data network using remote computers in real-time or offline processing.

The data and information determined from examination of the wellbore 203 may be utilized to perform measurements, analysis, or actions for exploration or production of the reservoir 201. The wellbore 203 may be drilled and configured with the reservoir 201 to extract wellbore fluids or gases from the formation. The size, shape, direction, and depth of the wellbore 203 may vary based on the conditions and estimated natural resources available. The wellbore 203 may include any number of support structures or materials, divergent paths, surface equipment, or so forth.

Figure 3:
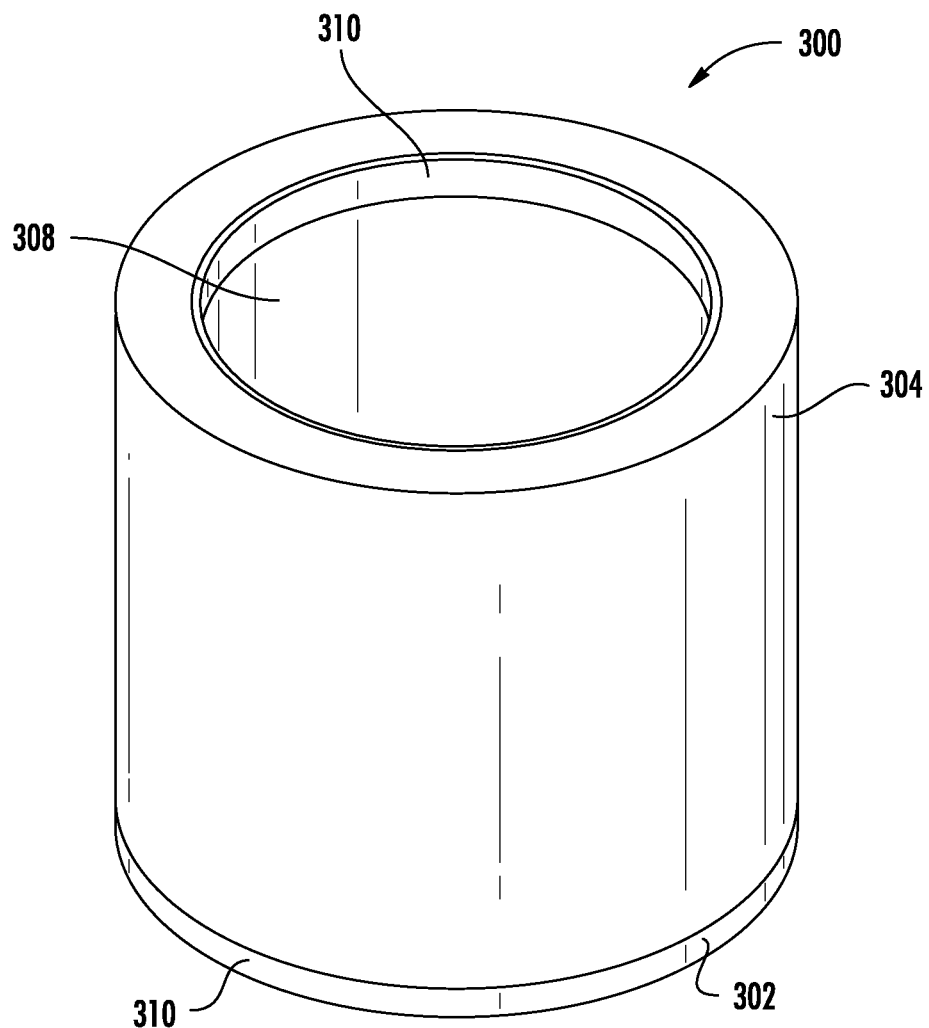
FIG. 3 is a cylindrical hydrophone according to an illustrative embodiment.

The instant disclosure describes a pressure sensor, a hydrophone, for use in LWD or MWD systems. FIG. 3 illustrates one example of a hydrophone 300 that may be used in a downhole tool. The hydrophone 300 is a cylindrical hydrophone and includes a cylindrical base 302. The base 302 is plated with an external electrode 304 and an internal electrode 308. In this embodiment, the plated electrodes leave an insulation area 310, which in this instance is a gap of unplated base material to separate the electrodes 304, 308, which will be explained more fully with reference to FIGS. 6 and 7.

The base 302 may be formed of a piezoelectric material. The piezoelectric material can be chosen from any art recognized piezoelectric materials, natural or man-made. According to one embodiment, the piezoelectric material is chosen from one or more of piezoelectric ceramics, piezoelectric polymers, or crystalline materials, including by not limited to Quartz, PMN-PT crystal, PZN-PT Relaxor-based crystal and the like.

The electrodes 304, 308 may be adhered to the base by any appropriate method of manufacture including but limited to plating, including electroplating and electroless plating: deposition, including vapor deposition, ion plating, sputtering deposition, laser surface alloying and chemical vapor deposition; thermal spray coating, including combustion torch, electric arc and plasma sprays. As used herein, the application of the electrodes 304, 308 to the piezoelectric base material 302 will be referred to as metallizing.

The electrodes 304, 308 comprise metallic electrode materials chosen from any art recognized electrode materials. According to one embodiment, the electrode material is chosen from one or more of silver, gold, nickel, cobalt, tin, chromium, vanadium, copper, zinc, and alloys thereof.

Figure 4:
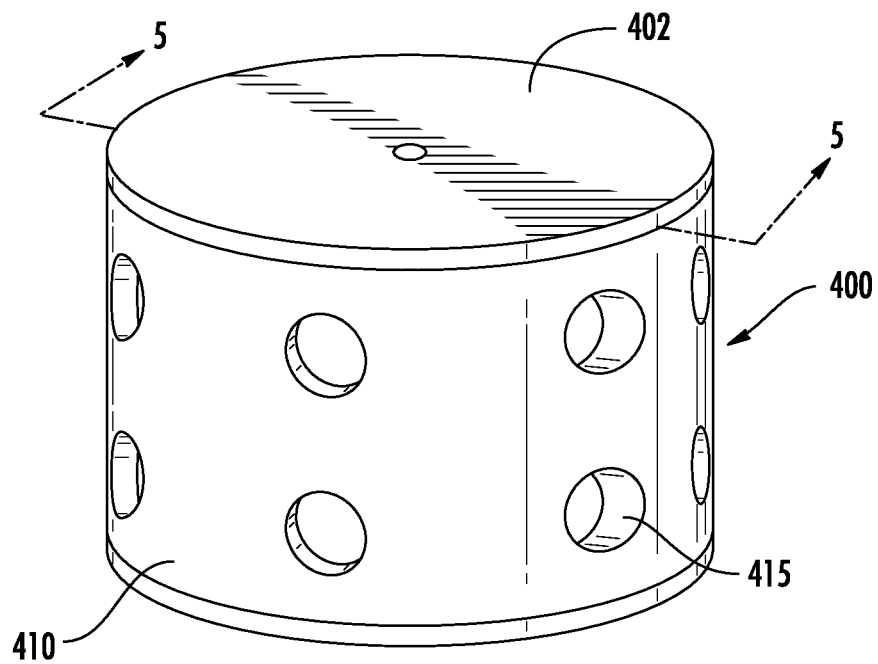
FIG. 4 is a cylindrical hydrophone enclosed in a stabilizing jacket according to an illustrative embodiment.

FIG. 4 illustrates a stabilizing jacket 400 that surrounds the hydrophone 300 as seen in FIG. 3. The jacket 400 is made from an insulated shell 410 that surrounds the hydrophone 300. As used herein "insulated shell" refers to the cylinder of insulating material within which the hydrophone rests. As used herein, "stabilizing jacket" refers to the insulating shell 410 in combination with the end caps 402. The ends of the insulated shell 410 are closed with metal end caps 402. The hydrophone stabilizing jacket 400 can be creating by securing the end caps 402 to the insulating shell 410. In one embodiment, the end caps 402 are attached to the insulating cylinder 410 by providing screw threads on the insulating cylinder and screwing the end caps on to secure them.

The insulating shell 410 can be made of any art recognized insulated material. According to one embodiment, the insulating shell 410 is made of one or more ceramic materials. The material of the insulating shell needs to be non-conductive and strong to prevent damage to the encased hydrophone 300.

The end caps 402 may be made of a conductive material, preferably a metal. According to one embodiment, the end cap material is chosen from one or more of stainless steel, brass, kovar, silver, gold, nickel, cobalt, tin, chromium, vanadium, copper, zinc and alloys thereof.

Figure 5:
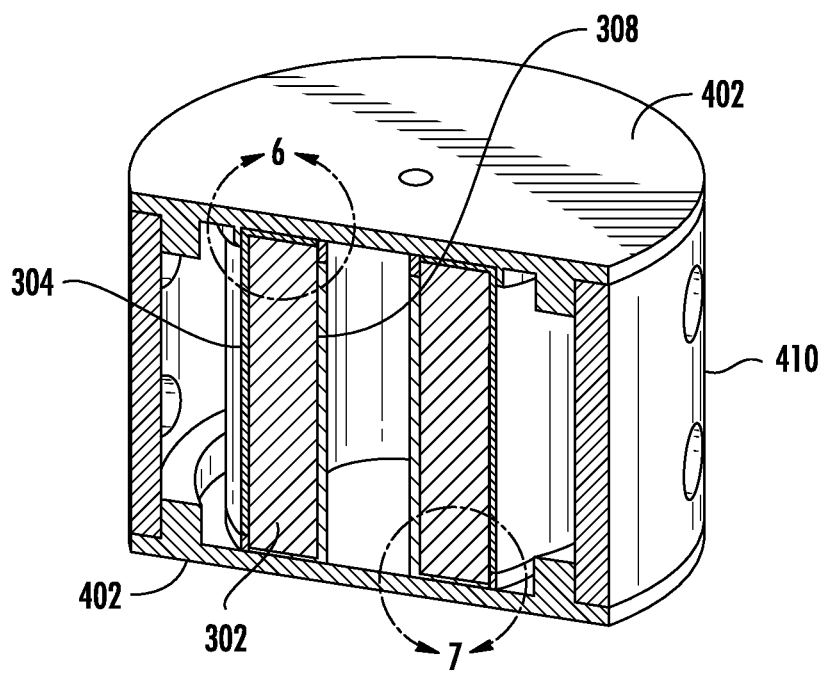
FIG. 5 is a cut away view of the hydrophone of FIG. 3 and stabilizing jacket of FIG. 4.

FIG. 5 is a cutaway view of the jacketed hydrophone 400 at line 5-5. As can be seen in FIG. 5, the hydrophone 300 is placed inside the insulating shell 410 and when the end caps 402 are secured to the shell 410, the circuit is completed and the hydrophone 300 is held stable between the end caps 402. No internal leads are necessary and external leads (not shown) may be attached to one or more end caps 402. The stabilizing jacket 400 surrounds the hydrophone 300 and reduces the stress on the piezoelectric cylindrical base 302.

Figure 6:
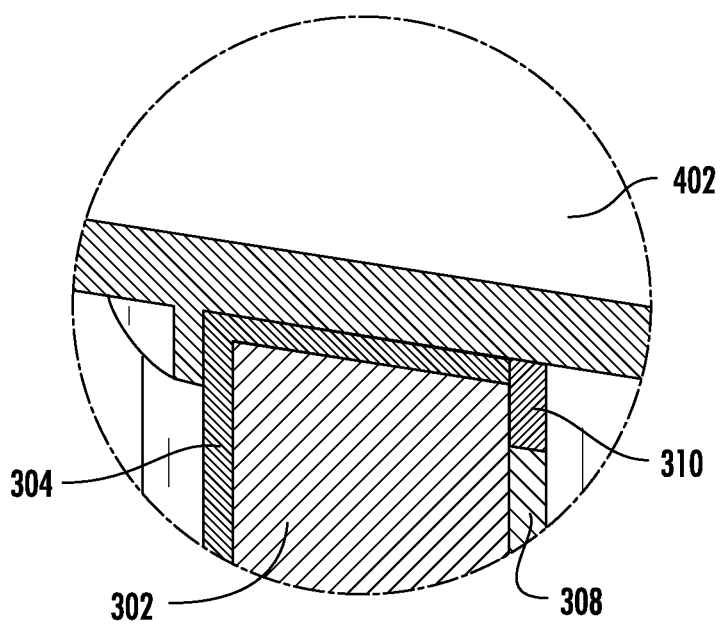
FIGS. 6 and 7 are enlarged views of the electrical connections of the hydrophone of FIG. 3.
Figure 7:
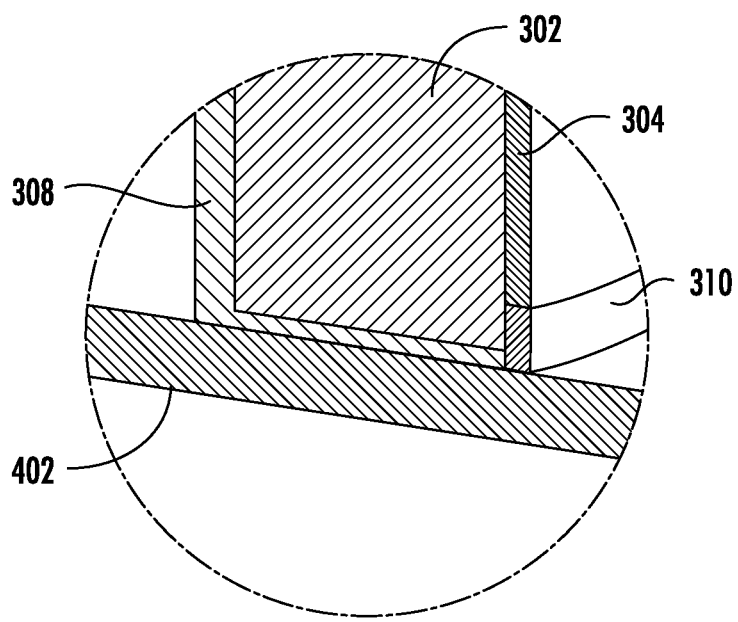

As can be seen in FIGS. 6 and 7, the metallic end cap 402 contacts the electrodes 304, 308 along the electrode material that is plated on the respective ends of the cylindrical base 302. An insulated region 310 separates the end cap 402 from the other electrode, 308 or 304, respectively. As used herein, the terms "insulate," "insulated," and "insulating," refer to a material or lack of material that prevents or reduces the passage, transfer or leakage of heat, electricity, or sound from one location to another.

The insulated area 310 can be a gap in the plating material of electrodes 304 or 308 which creates an insulated region where only the cylindrical base 302 contacts the metal end caps 402 between the electrodes. In an alternative embodiment, not shown in the figures, the gap area 310 may comprise an additional insulating material to prevent contact between the electrodes. The additional insulation material may be chosen from any art recognized insulator. According to one embodiment, the insulation is chosen from polymeric insulator, spray foam, plastic, varnish, paint and the like.

Figure 8:
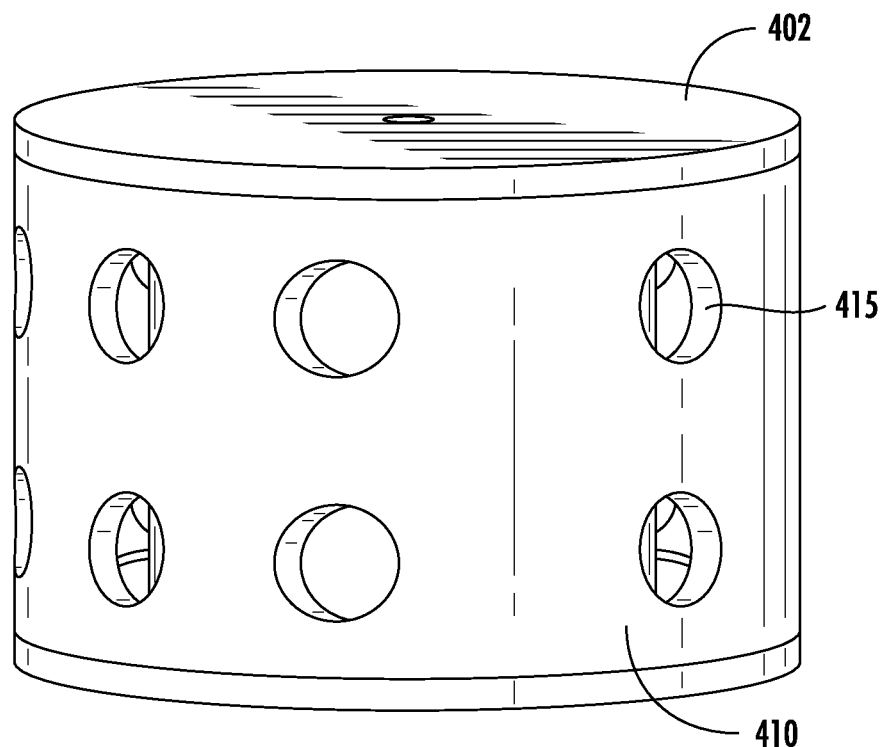
FIG. 8 illustrates one distribution of openings on the stabilizing cylinder according to one illustrative embodiment.

FIG. 8 illustrates the stabilizing jacket 400 comprised of the insulating shell 410 and the end caps 402. The insulating shell is provided with openings 415. The openings 415 reduce the impedance through the stabilizing jacket allowing the fluid pressure to be felt directly by the piezoelectric cylinder 302. The shape and distribution of the openings are based upon a balance between fluid access to the hydrophone and the strength of the insulating shell so that it doesn't break during use. According to one embodiment, the openings account for less than 50% of the surface area of the insulating cylinder, for example, less than 40% of the surface area, for example, less than 30% of the surface area.

Figure 9:
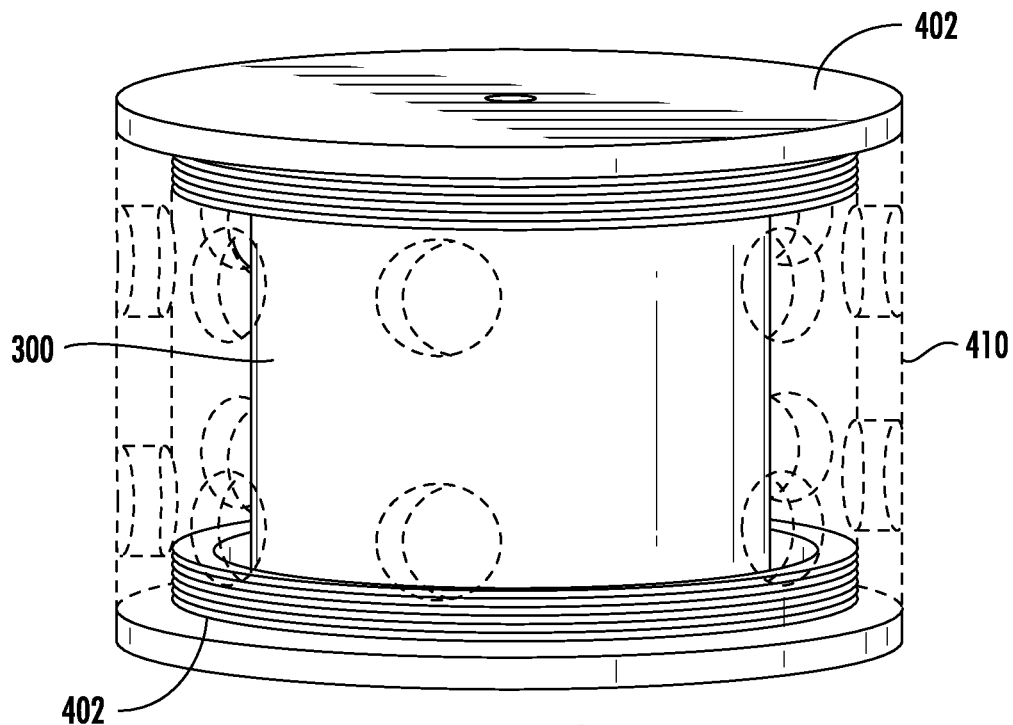
FIG. 9. illustrates the hydrophone of FIG. 3, as seen looking through the stabilizing jacket.

FIG. 9 provides a view of the hydrophone 300 as seen through the shell 410. While the hydrophone is described with respect to a cylindrical hydrophone, other non-cylindrical hydrophones can be constructed in the same manner as described. The hydrophone can be any shape that will allow contact to be established between the electrode material along the edge thereof and an end cap. Alternative shapes include spherical, square, rectangular or any other art recognized shape.

When one or more jacketed hydrophones 400 is included in the bottom hole sensory system 65 of the bottom hole assembly 60 of FIG. 1, the sensor system 65 can measure changes in fluid pressure which can provide information regarding seismic events, drill location, formation mechanical properties, cross-well surveys, sonar, leak detection and flow generated noise detection.

According to one embodiment, the jacketed hydrophone 400 may be electrically coupled to one or more additional jacketed hydrophones to form an array.

Other embodiments of the present invention can include alternative variations. These and other variations and modifications will become apparent to those skilled in the art once the above disclosure is fully appreciated. It is intended that the following claims be interpreted to embrace all such variations and modifications.

What is claimed is:

1. A hydrophone, comprising:
a piezoelectric base;
a first electrode along a first end of the base;
a second electrode along a second end of the base;
end caps in direct contact with the first and second electrodes along the respective first and second ends of the base; and
wherein the first and second electrodes are spaced apart by insulation areas.

2. The hydrophone of claim 1, wherein the first and second electrodes are plated onto surfaces of the piezoelectric base.

3. The hydrophone of claim 2, wherein the insulation areas are created by ending the electrode plating before reaching the ends of the base, thereby leaving gaps between the first and second electrodes.

4. The hydrophone of claim 1, wherein the insulation areas further comprise an insulation material in the insulation areas.

5. The hydrophone of claim 1, wherein the end caps are metal and a circuit is formed by the electrodes and metal end caps without the need for internal leads.

6. The hydrophone of claim 1, wherein the end caps are secured to each other to provide structural support to the base, first electrode, and second electrode.

7. A downhole tool for use in a wellbore, comprising a hydrophone comprising:
a piezoelectric base;
a first electrode along a first end of the base;
a second electrode along a second end of the base;
end caps in direct contact with the first and second electrodes along the respective first and second ends of the base; and
wherein the first and second electrodes are spaced apart by insulation areas.

8. The hydrophone of claim 7, wherein the first and second electrodes are plated onto surfaces of the piezoelectric base.

9. The hydrophone of claim 8, wherein the insulation areas are created by ending the electrode plating before reaching the ends of the base, thereby leaving gaps between the first and second electrodes.

10. The hydrophone of claim 7, wherein the insulation areas further comprise an insulation material in the insulation areas.

11. The hydrophone of claim 7, wherein the end caps are metal and a circuit is formed by the electrodes and metal end caps without the need for internal leads.

12. The hydrophone of claim 7, wherein the end caps are secured to each other to provide structural support to the base, first electrode, and second electrode.

13. The downhole tool of claim 7, wherein the downhole tool is part of a measurement-while-drilling system comprising a drill bit.

14. A method of logging a reservoir in a formation, comprising:
placing a downhole tool in a wellbore in the formation, the downhole tool comprising a hydrophone comprising a piezoelectric base with a first electrode along a first end of the base, a second electrode along a second end of the base, end caps in direct contact with the first and second electrodes along the respective first and second ends of the base, and wherein the first and second electrodes are spaced apart by insulation areas; and measuring properties of the reservoir with the hydrophone.

15. The method of claim 14, further comprising placing the downhole tool in the wellbore on a wireline.

16. The method of claim 14, further comprising placing the downhole tool in the wellbore on a drill string and drilling the wellbore while the downhole tool is in the wellbore.

17. The method of claim 14, wherein the end caps are metal and further comprising forming a circuit between the electrodes and the end caps without the need for internal leads.

18. The method of claim 14, further comprising securing the end caps to each other to structurally support the base, first electrode, and second electrode.

19. The method of claim 14, further comprising transmitting the hydrophone measurement data to a surface receiver at the surface of the wellbore.

20. The method of claim 14, further comprising processing the received hydrophone measurement data with a computer and generating a display of the data on a monitor.

* * * * *